United States Patent

Imao et al.

[11] Patent Number: 6,006,621
[45] Date of Patent: Dec. 28, 1999

[54] AUTOMATIC SPEED-CHANGE APPARATUS FOR A GEAR TRANSMISSION

[75] Inventors: Toshio Imao; Eiji Takeyama, both of Nagoya, Japan

[73] Assignee: Aichi Kikai Kogyo Kabushiki Kaisha, Nagoya, Japan

[21] Appl. No.: 09/222,759

[22] Filed: Dec. 30, 1998

[30] Foreign Application Priority Data

Jan. 12, 1998 [JP] Japan ................................. 10-018153

[51] Int. Cl.$^6$ ................................................. F16H 63/16
[52] U.S. Cl. ................................................. 74/336 R
[58] Field of Search ................................. 74/335, 336 R

[56] References Cited

U.S. PATENT DOCUMENTS 5,724,856  3/1998  Back ........................................... 74/335

FOREIGN PATENT DOCUMENTS

| 19530616 | 2/1997 | Germany | ........................... 74/335 |
| 6151497 | 5/1980 | Japan . | |
| 01-087948 | 4/1989 | Japan . | |
| 07-301331 | 11/1995 | Japan . | |

*Primary Examiner*—Sherry L. Estremsky
*Attorney, Agent, or Firm*—Dennison, Meserole, Scheiner & Schultz

[57] ABSTRACT

The object is to provide a small-sized speed-change apparatus for performing the automatic gear shifting of the conventional gear transmission. In the speed-change apparatus 1, the select mechanism comprises a select motor 6 controllable for forward and backward rotation, gears 7, 8 for transmitting the rotation, a select-shift shaft 11 to be rotated forward and backward through said gears 7, 8 and connected with the select-shift rod 5 of the gear transmission M; and the shift mechanism comprises a piston 12 for moving the select-shift shaft 11 in the axial direction, hydraulic chambers 13, 14 accommodating the piston 12 and a shift-operating hydraulic-pressure generator for supplying the hydraulic oil through hydraulic tubes into the hydraulic chambers 13, 14.

3 Claims, 6 Drawing Sheets

SHIFT PATTERN

AUTOMATIC SPEED-CHANGE APPARATUS FOR A GEAR TRANSMISSION

BACKGROUND OF THE INVENTION

1. Field of the Invention

The present invention relates to an automatic speed-change apparatus for a gear transmission.

2. Description of the Prior Art

In the prior art, there has been developed an apparatus in which the mechanism for a manual gear transmission is used as it is and the speed change operation is automated through a hydraulic apparatus by a computer control. However, it requires three cylinders for clutching, shifting and selecting, and a number of solenoid valves to actuate these cylinders, so that it has such problems as complicated structure, large size and high cost.

Also, a speed-change apparatus in which motors are used as actuators to select or shift the gear transmission has been disclosed in JP publication Toku-ko-sho 61-51497, for example. However, this apparatus requires certain numbers of motors depending on the numbers of the select lines, and because of using a plurality of motors or solenoids, it results in a complicated structure and large size apparatus and further in high cost.

SUMMARY OF THE INVENTION

Accordingly, the present invention has been developed in order to solve the above problems in the prior art, and an object of the invention is to provide an automatic speed-change apparatus which is formed in a small size and can be disposed in a narrow space.

Another object of the present invention is to provide an automatic speed-change apparatus which is supplied with hydraulic fluid from a hydraulic pressure generator properly arranged at a position separated from itself.

The preceeding objects are accomplished in an automatic speed-change apparatus for a gear transmission having a select-shift rod extended out thereof; said automatic speed-change apparatus connected with said select-shift rod for performing automatic shift operation of said gear transmission by converting driving force of motors into the rotational and the axial movement of said select-shift rod to transmit the movement to the shift fork of the transmission; said automatic speed-change apparatus provided with a select mechanism for performing the select operation and a shift mechanism for performing the shift operation; said select mechanism comprising a select motor controllable for forward and backward rotation, gears for transmitting the rotation, a select-shift shaft to be rotated forward and backward through said gears and connected with said select-shift rod; and said shift mechanism comprising a piston for moving said select-shift shaft in the axial direction, a hydraulic chamber accommodating said piston, and a shift-operating hydraulic-pressure generator for supplying the hydraulic oil through hydraulic tubes into said hydraulic chamber.

DESCRIPTION OF THE PREFERRED EMBODIMENT

With reference to the accompanying drawings, a preferred embodiment of the present invention will be described hereinafter.

Figure 1:
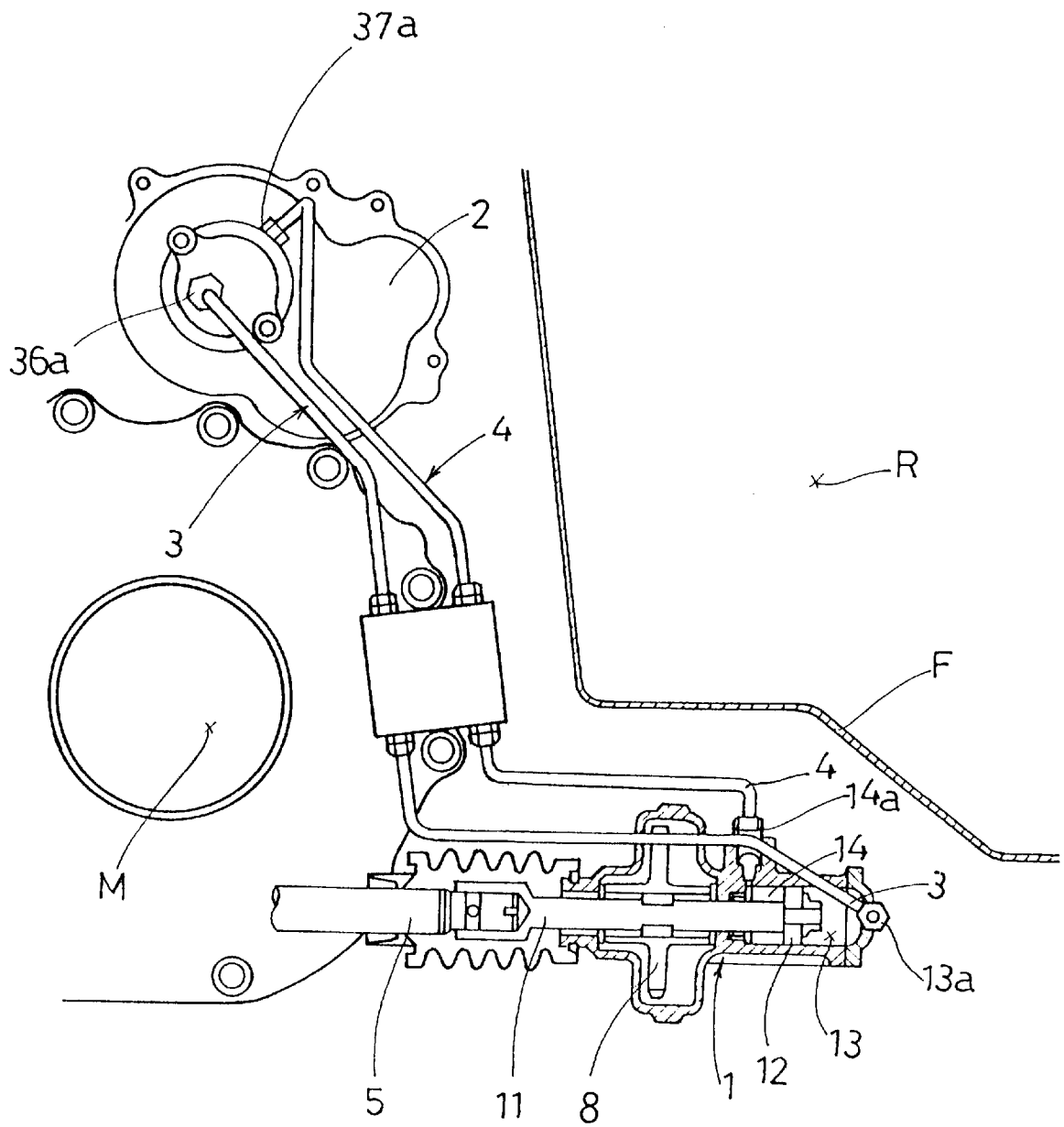
FIG.1 is a schematic arrangement of an automatic speed-change apparatus and a hydraulic pressure generator for shift operation disposed for a gear transmission.

FIG.1 is a schematic arrangement of an automatic speed-change apparatus 1 for automatically performing the speed change of a conventional gear transmission M installed below a floor F of a cockpit R in an automobile and a shift-operating haydralic pressure generator 2 for supplying hydraulic fluid to the apparatus 1. The automatic speed-change apparatus 1 is connected directly with a select-shift rod 5 extended out of the gear transmission M and disposed in the narrow lower part of the space. The shift-operating hydraulic pressure generator 2 is disposed in the comparatively wide upper part of the space. The automatic speed-change apparatus 1 and the shift-operating hydraulic pressure generator 2 are communicated with each other by a first hydraulic tube 3 and a second hydraulic tube 4.

That is to say, since the automatic speed-change apparatus 1 of the invention can be formed of small size, it can be compactly disposed in a narrow space in a lower part of an automobile. On the other hand, the shift-operating hydraulic pressure generator 2 of comparatively large size is disposed in comparatively broad space in an upper part of the automobile. They are communicated with each other by the hydraulic tubes 3, 4 which are possible to make free layout of tubing, and installed compactly as a whole below the floor F.

Figure 5:
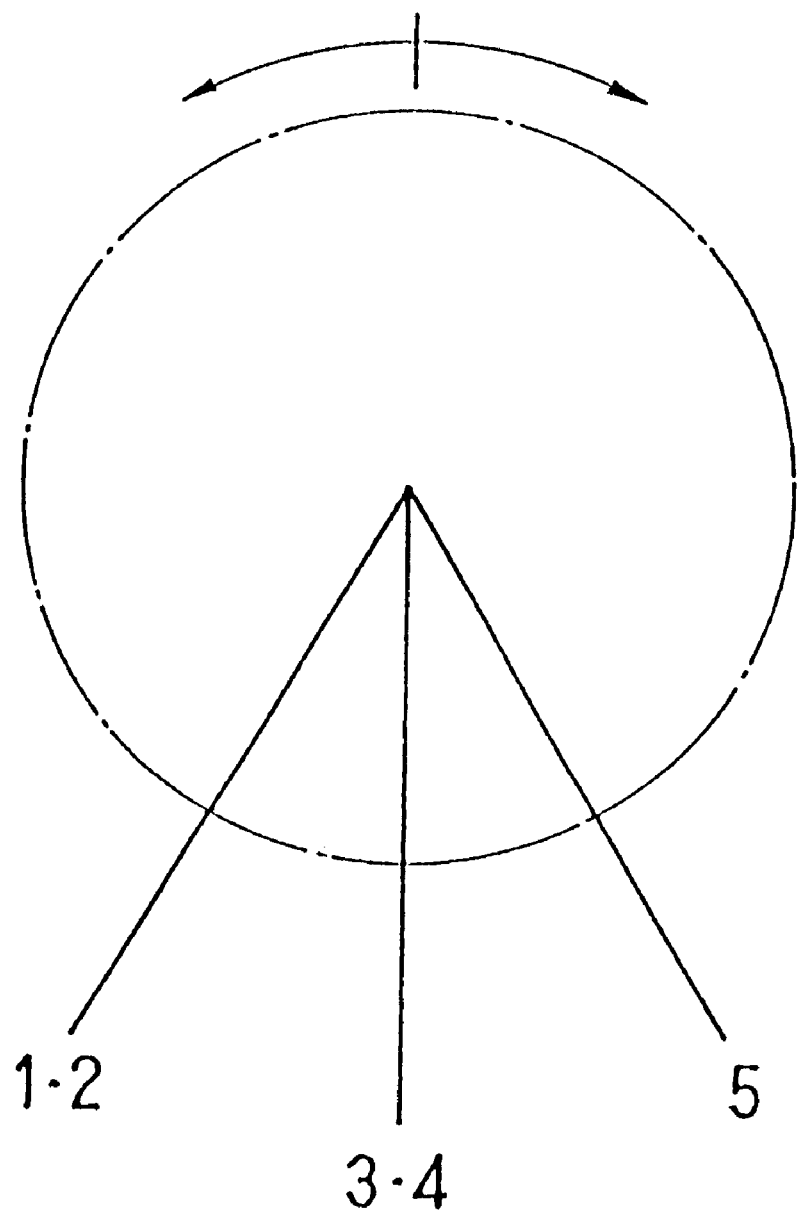
FIG.5 is an illustration of select operation in a gear transmission.

Incidentally, in the gear transmission M, by rotating the extended select-shift rod 5 on its axis, a shifting line is selected within the gear transmission M, as shown in a diagram of the select operation of FIG.5. As shown in FIG.5, by rotating the select-shift rod clockwise on its axis, the low or the second speed position can be selected, and also by rotating it counterclockwise, the fifth speed position can be selected, and by putting it on the center shifting line, the third or the fourth speed position can be selected.

Figure 6:
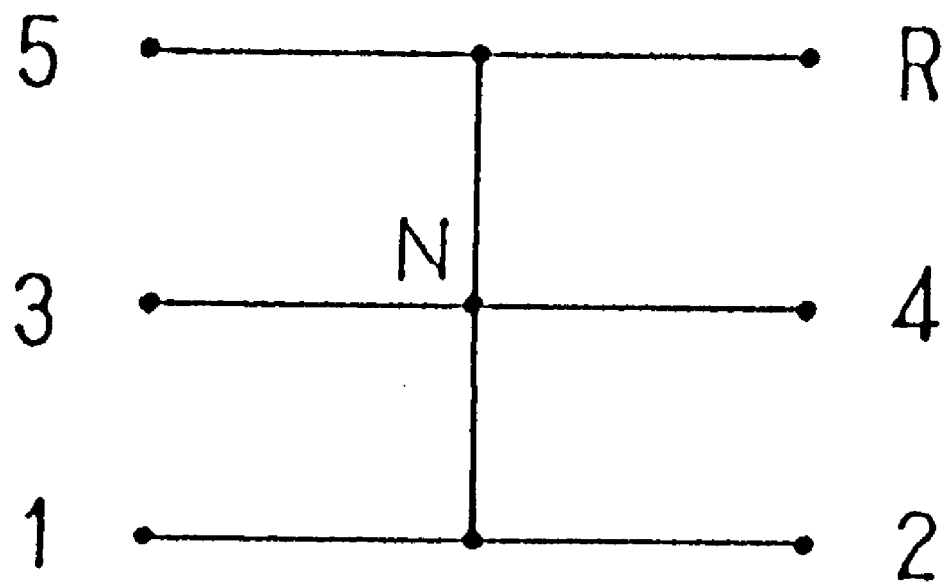
FIG.6 is a shift pattern diagram of shift operation in a gear transmission.

After a shifting line in the transmission is selected as described above, by moving the select-shift rod 5 in the axial direction, the shift fork in the transmission is subsequently moved, and the innner gear is shifted in the required low or second position, for example, as shown in a diagram of the shift pattern of FIG.6. Thus, the speed-change operation can be completed.

Figure 2:
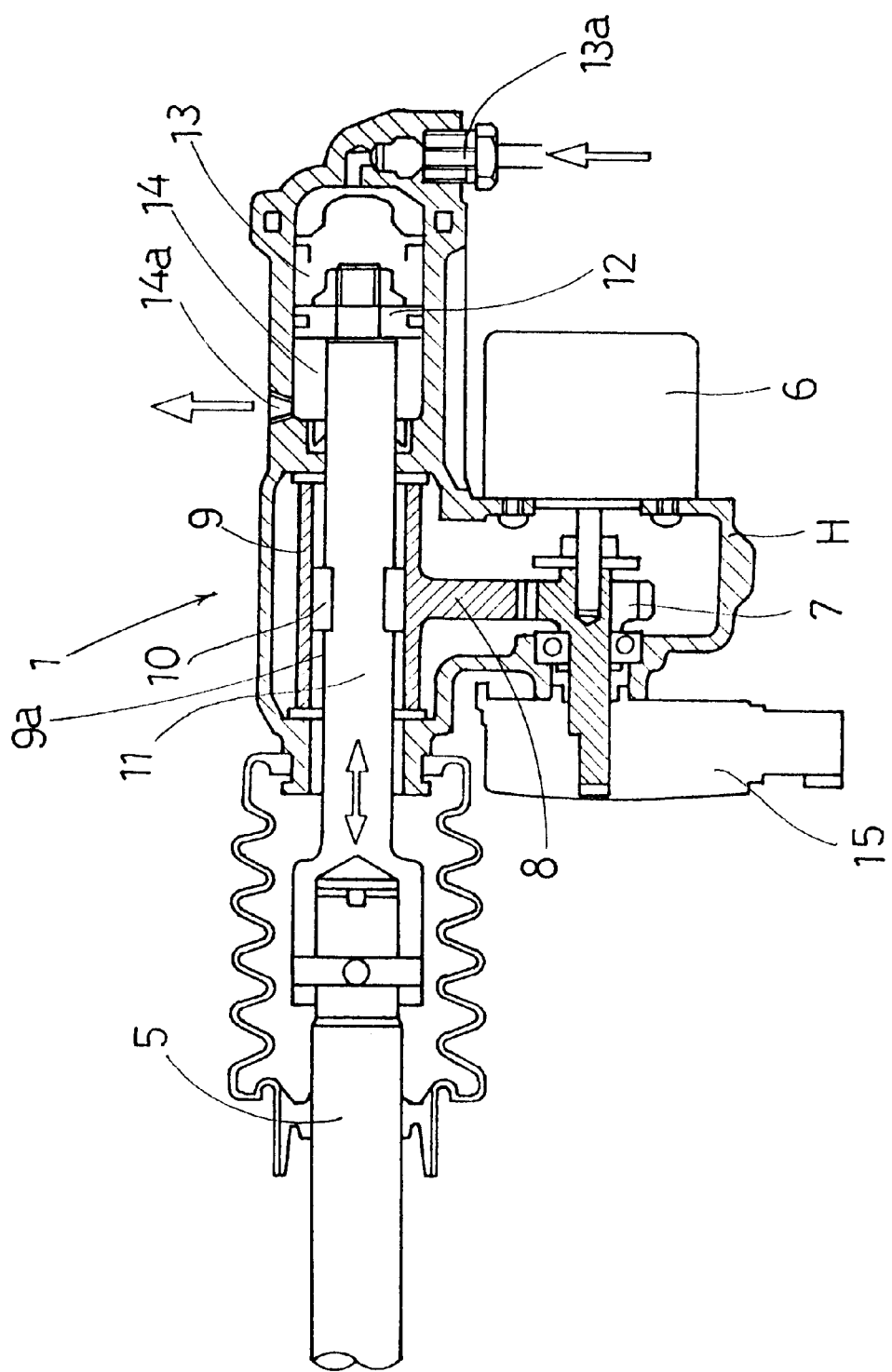
FIG.2 is a sectional view of an automatic speed-change apparatus directly connected with a gear transmission.

The automatic speed-change apparatus 1 is directly conneceted with the select-shift rod 5 extended out of this gear transmission M. Within the apparatus 1 is provided a select-shift shaft 11 coaxially connected with the select-shift rod 5, as shown in FIG.1 and FIG.2. Also, there is provided a select motor 6 that is controllable for forward and backward rotation and has a select drive gear 7 fixedly provided on the motor shaft. This select drive gear 7 is rotatable through a bearing provided on the housing H. On the outer portion of the select drive gear 7 projected out of the bearing is provided a select sensor 15 coaxially with the gear 7. This select sensor 15 is adapted to detect an angle of rotation of the select motor 6. With the select drive gear 7 is meshed a select driven gear 8 which is integrally provided on a cylindrical member 9 and formed in a sectorial shape. The cylindrical member 9 is disposed over the periphery of the select-shift shaft 11. In a spline 9a axially formed on the inner periphery of the cylindrical member 9 is inserted a slide key 10 fixed on the outer periphery of the select-shift shaft 11. Consequently, the select-shift shaft 11 is axially movable to the cylindrical member 9 and the rotation of the cylindrical member 9 is transmitted through the slide key 10 to the select-shift shaft 11.

The left end of the select-shift shaft 11, as shown in FIG.2, is connected with the select-shift rod 5 of the gear transmission M and the other end is extended to the right and connected with a piston 12 disposed in a cylinder formed in the housing H. By the piston 12 the interior of the cylinder is divided into a first hydraulic chamber 13 and a second hydraulic chamber 14, and in the respective chambers are formed operating oil gateways 13a, 14a respectively.

In such a constitution, when the select motor 6 is operated, the select drive gear 7, select driven gear 8 and cylindrical member 9 are rotated and accordingly the select-shift shaft 11 is rotated on the axis. Thereby, the select-shift rod 5 is rotated to select a line of the shift fork within the gear transmission N as described above.

Next, when the operating oil is supplied from the shift-operating hydraulic-pressure generator 2 through the hydraulic tubes 3, 4 to any one of the first hydraulic chamber 13 and second hydraulic chamber 14, the piston 12 is moved in the axial direction, and accordingly the select-shift shaft 11 is axially moved to cause the select-shift rod 5 move in the axial direction. Thereby, the shift fork in the gear transmission M is subsequently moved to perform gear shifting.

Thus, the automatic speed-change apparatus 1 of this invention has a compact combination of a select mechanism comprising gears 7, 8 to be rotated by a select motor 6 and a select-shift shaft 11 to be rotated through the gears 7, 8; and a shift mechanism comprising a piston 12 provided in hydraulic chambers 13, 14 and the select-shift shaft 11 to be axially moved by the piston 12. Consequently, the whole of the apparatus can be formed in an extremely small-sized and compact form and disposed compactly even in a narrow space. Incidentally, with the operating oil gateway 13a is connected the first hydraulic tube 3 and with the operating oil gateway 14a is connected the second hydraulic tube 4.

Figure 3:
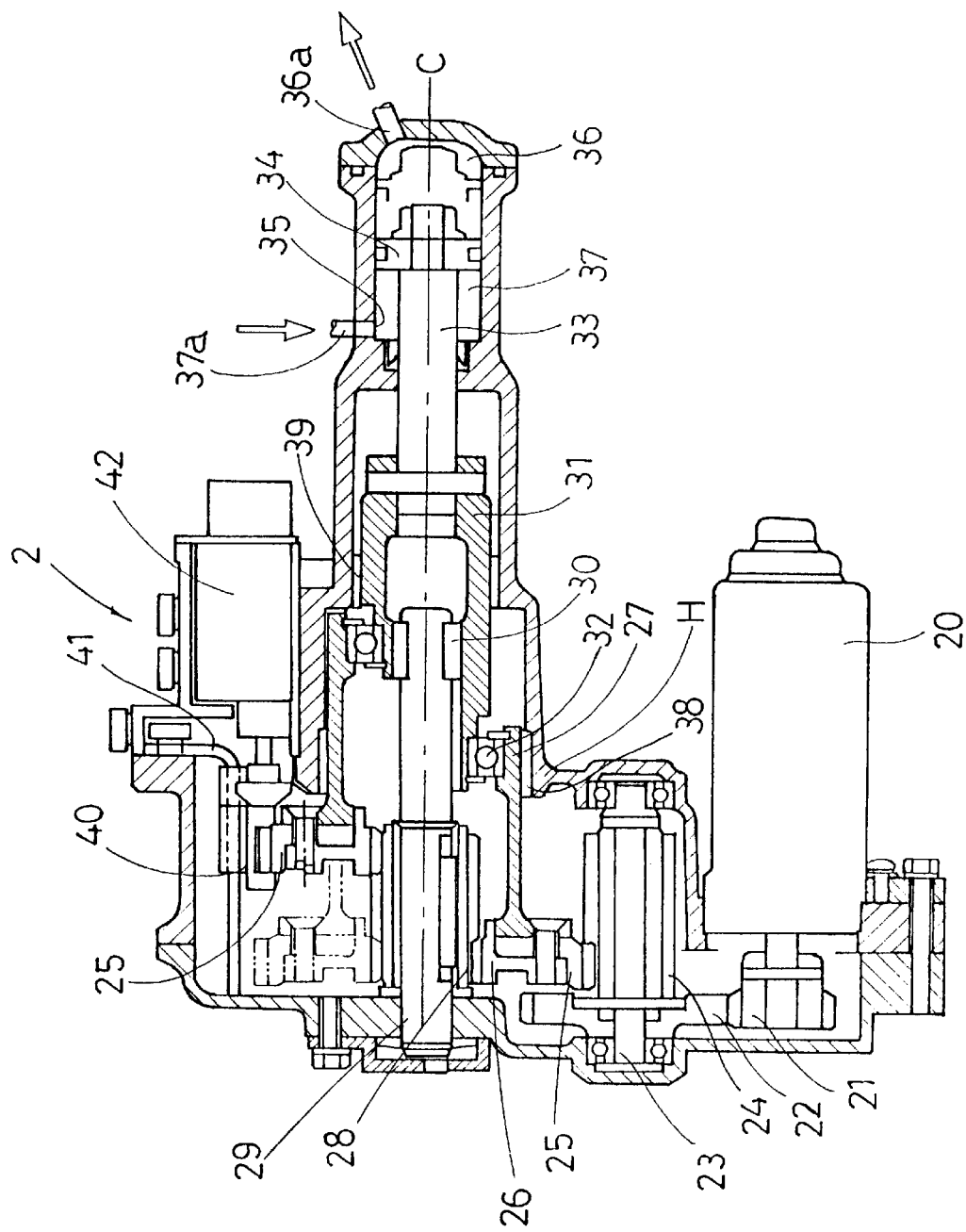
FIG.3 is a sectional view of a hydraulic pressure generator for shift operation.

On the other hand, the shift-operating hydraulic-pressure generator 2 for supplying shift-operating oil into the first hydraulic chamber 13 and second hydraulic chamber 14 is formed in a structure as shown in the sectional view of FIG. 3. The hydraulic-pressure generator 2 is provided with a shift motor 20 rotatable forward and backward, and in the ho using H is provided a shift drive gear 21 fixed to the shaft of the motor 20. With the drive gear 21 is meshed a shift driven gear 22, which is fixed to an intermediate shaft 23. To the intermediate shaft 23 is further fixed a long shift gear 24 extending in the axial direction. With the long shift gear 24 is meshed a shift gear 25, to which is fixed a female screw 26 and a slider 27 extending in the axial direction. With the female screw 26 is meshed a male screw 28 fixedly fitted on the periphery of a shift shaft 29.

The shift shaft 29 is fixed at the left end to the housing H and provided on the periphery at the right end with a slide key 30. On the periphery of this slid key 30 is provided a sleeve 31 slidably in the axial direction. The left end of the sleeve 31 is connected with the right end of the slider 27 through an slider bearing 32 interposed. The slider 27 is rotatably disposed onto the housing H through a bearing 38. The sleeve 31 is axially movably disposed on the housing H through a bearing 39.

With the right end of the sleeve 31 is connected a piston rod 33 extending in the right direction, to the end of which is fixed a piston 34. This piston 34 is disposed in a cylinder 35 formed in the housing H. The interior of the cylinder 35 is divided into a first hydraulic chamber 36 an d a second hydraulic chamber 37 by the piston 34. In the respective hydraulic chambers 36, 37 are provided operating oil gateways 36a, 37a respectively. The operating oil gateway 36a is connected with the first hydraulic tube 3 and the operating oil gateway 37a is connected with the second hydraulic tube 4.

Figure 4:
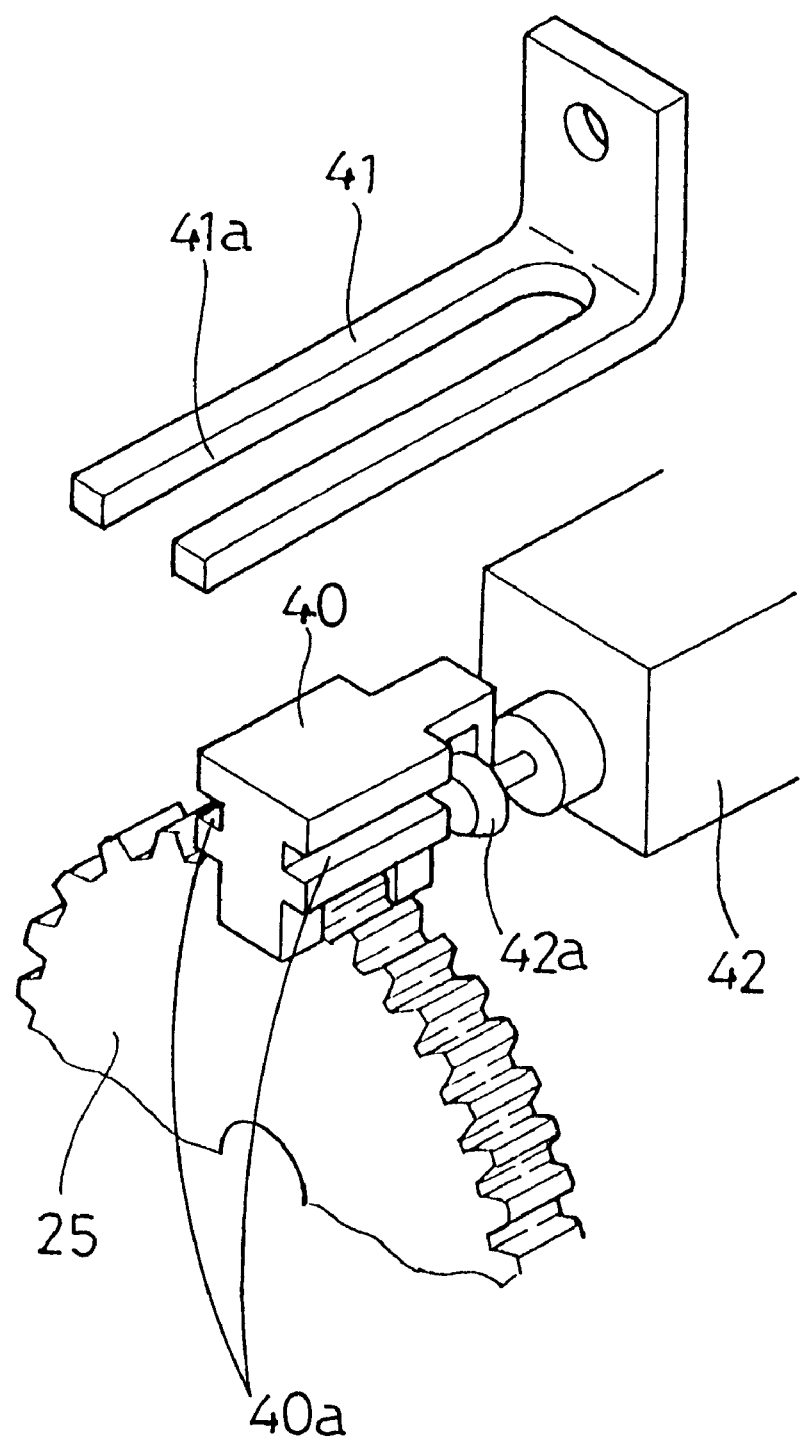
FIG.4 is an exploded perspective view of a principal mounting structure for the stroke sensor in FIG.3.

On the periphery of the shift gear 25 is disposed a slide piece 40, as shown in the exploded perspective view of FIG.4, extending over both side surfaces of the shift gear 25. This slide piece 40 is axially movably mounted on a guide bracket 41 of which one end is fixed to the housing; the inside of U-shaped slot 41a of the guide bracket 41 is inserted in guide grooves 40a formed in the slide piece 40. The right surface of this slide piece 40, shown in the drawing, is brought into contact with a contact member 42a extending from a stroke sensor 42. Consequently, this stroke sensor 42 is adapted to detect the amount of axial movement of the shift gear 25 through the slide piece 40.

In such a sift-operating hydraulic-pressure generator 2, by operating the shift motor 20 the long shift gear 24 is rotated through the shift drive gear 21 and shift driven gear 22, and accordingly the shift gear 25 is rotated. Since the female screw 26 fixed to this shift gear 25 is meshed with the male screw 28, the shift gear 25 is axially moved along the male screw 28. Thereby, the slider 27 is axially moved rotating. Since the rotating force of the slider 27 is cut by the slider bearing 32, the rotating force is not transmitted to the sleeve 31, which is moved only in the axial direction. Consequently, the piston rod 33 is axially moved and by the axial movement of the piston 34 any one of the first and the second hydraulic chamber 36, 37 is compressed, so that the hydraulic oil is supplied outside under pressure. As a result, the pressurized operating oil is supplied into the first hydraulic chamber 13 or the second hydraulic chamber 14 of the automatic speed-change apparatus 1 and the sift operation of the apparatus 1 is performed by the hydraulic oil.

That is, when the select operation is performed, the shift motor 20 is in the rest condition and only the select motor 6 is operated to perform the select operation. Thereafter, the select motor 6 is stopped, and by operating the shift motor 20 the shift operation is performed.

Although in this embodiment the stroke sensor 42 is adapted to detect the axial movement of the shift gear 25, it is possible that the stroke sensor 42 is arranged so as to detect the amount of axial movement of any one of the slider 27, sleelve 31, piston rod 33 or the select shift shaft 11.

As described above, the shift-operating hydraulic-pressure generator 2 of this invention is disposed in a place distant from the automatic speed-change apparatus 1 and can automatically perform the select and the shift operation of the gear transmission M through the hydraulic tubes 3, 4 communicating the generator 2 with the apparatus 1.

Besides, instead of the sift-operating hydraulic-pressure generator 2, it is also possible to use a hydraulic pump in order to supply hydraulic oil into the first and the second hydraulic chamber 13, 14 of the automatic speed-change apparatus 1. This hydraulic pump may be constituted to be operated by an engine or an electric motor, and further may be adapted to supply the operating oil into the first or the second hydraulic chamber 13, 14 of the automatic speed-change apparatus 1 by switching of a control valve. Also in this case, through a hydraulic tubing the supply of hydraulic oil can be performed from the hydraulic pump into the hydraulic chambers 13, 14 of the automatic speed-change apparatus 1, so that the apparatus 1 is constituted in a small size and disposed in a compact arrangement.

What is claimed is:

1. An automatic speed-change apparatus for a gear transmission having a select-shift rod extended out thereof and a shift fork connected to said select-shift rod comprising:

a select mechanism for rotating the select-shift rod to select a shifting line in the transmission and a shift mechanism for moving the select-shift rod in an axial direction to move the shift fork;

said select mechanism comprising a select motor controllable for forward and backward rotation, a select-shift shaft connected with the select-shift rod, and at least one gear operatively connected between said select motor and said select-shift shaft for transmitting the rotation of said select motor to said select-shift shaft;

said shift mechanism comprising a piston for moving said select-shift shaft in an axial direction, a hydraulic chamber accommodating said piston, and a shift-operating hydraulic-pressure generator for supplying hydraulic oil through hydraulic tubes into said hydraulic chamber, wherein said shift-operating hydraulic-pressure generator comprises a shift motor controllable for forward and backward rotation, a sleeve to be axially moved by the rotation through gears and a screw mechanism, hydraulic chambers accommodating a piston, and said piston connected with said sleeve to be moved in said hydraulic chambers for generating hydraulic pressure.

2. An automatic speed-change apparatus for a gear transmission as defined in claim 1, wherein said select-shift shaft is directly connected with the gear transmission and said shift-operating hydraulic-pressure generator is disposed remotely from said hydraulic chamber.

3. An automatic speed-change apparatus for a gear transmission having a select-shift rod extended out thereof and a shift fork connected to said select-shift rod comprising:

a select mechanism for rotating the select-shift rod to select a shifting line in the transmission and a shift mechanism for moving the select-shift rod in an axial direction to move the shift fork;

said select mechanism comprising a select motor controllable for forward and backward rotation, a select-shift shaft connected with the select-shift rod, and at least one gear operatively connected between said select motor and said select-shift shaft for transmitting the rotation of said select motor to said select-shift shaft;

said shift mechanism comprising a piston for moving said select-shift shaft in an axial direction, a hydraulic chamber accommodating said piston, and a shift-operating hydraulic-pressure generator for supplying hydraulic oil through hydraulic tubes into said hydraulic chamber, wherein said shift-operating hydraulic-pressure generator comprises a hydraulic pump and wherein operating oil from said hydraulic pump is supplied into said hydraulic chamber through control valves.

* * * * *